Patented Nov. 23, 1943

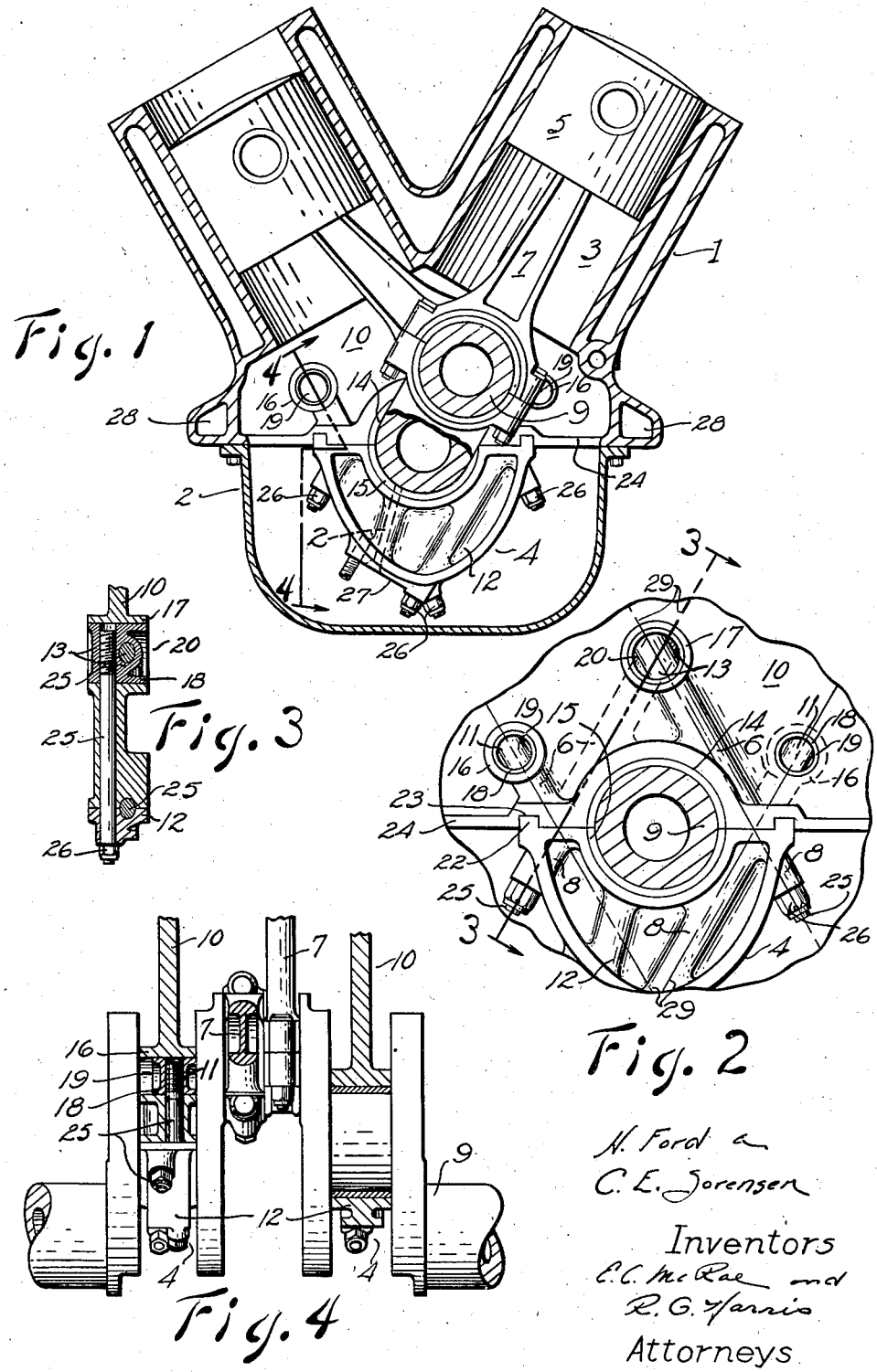

2,334,916

UNITED STATES PATENT OFFICE 2,334,916

BEARING

Henry Ford, Dearborn, and Charles E. Sorensen, Detroit, Mich., assignors to Ford Motor Company, Dearborn, Mich., a corporation of Delaware Application May 4, 1942, Serial No. 441,616

4 Claims. (Cl. 308—23)

This invention relates to bearings, and more particularly to crankshaft bearings adapted for use in connection with aircraft.

The trend of aeronautical design is such that the constant demand is for motors having greater horsepower. But additional useful power cannot be obtained by merely increasing the size of units or multiplying the number of units used, since the increase in weight would make such a practice disadvantageous. The manufacturer of aviation motors must seek maximum power output with minimum weight. At the same time, when designing to save weight one must not sacrifice the essential strength of any member or impair the reliability, durability or efficiency of the motor.

An object of this invention is to provide a bearing construction particularly adapted as a support for the crankshaft of the V-type aircraft engine. It is a further object to provide an assembly which is lighter than those in current use, and which embodies an original support unit for a bearing shaft, utilizing the strength of the materials employed to better advantage.

Another object is to provide an assembly which may be used in mass production, which may be readily assembled or disassembled and which is adjustable within reasonable limits, but which, when once assembled, is stronger, more durable and lighter than other similar devices known to the applicants.

These objects are accomplished in the bearing of our invention which embodies each of the advantages noted.

With these and other objects in view, our invention consists in the arrangement, construction and combination of the various parts of our improved device as described in the specification, claimed in our claims and illustrated in the accompanying drawing in which:

Figure 1 is a transverse section through an engine using the device of this invention, a portion only of the engine block being shown.

Figure 2 is also a partial transverse section thereof.

Figure 3 is a cross section of a portion of the structure taken on the line 3—3 of Figure 2.

Figure 4 is a side view of a portion of the crankshaft of the motor, a portion being shown in section corresponding to line 4—4 of Figure 1.

Referring to the accompanying drawing in which corresponding reference figures represent like parts in the various views, the mechanism of this invention includes the motor block 1 which is reinforced along its entire bottom edge by an integral box section 28, having crankcase 2, cylinders 3, pistons 5, and connecting rods 7 attached in the usual way to the throws of crankshaft 9. The crankshaft is supported at intervals within the crankcase by a plurality of bearing assemblies 4 as shown in Figure 4 and which form a part of this invention. These assemblies consist principally of an upper web 10 in the block 1, and secured thereto the bearing cap 12. The web and the bearing cap are formed to provide co-operating bearing seats 14 and 15, respectively, as is customary in this form of construction.

The web is provided with two side bosses 16, and a central boss 17 and has conduits 6 formed therein leading from these bosses along the center lines 29 indicated on Figure 2. Similar conduits 8 are formed in the material of the cap 12, aligning with the conduits 6 in the web as shown by the continuations of the center lines. Each side boss receives a single anchor 19 and the central boss has a double anchor 20. These anchors are in the form of a main sleeve 18 fitted in the boss. The anchors 19 each have a second sleeve 11 disposed in the main sleeve 18 with its axis normal to the axis thereof, the interior of the second sleeve being tapped through. This construction is clearly shown in Figure 4. Anchor 20 is of similar construction except that two sleeves 13 are provided within the main sleeve 18, the angle between the axes of the included sleeves 13 being the same as the V-angle of the motor block. The construction of this particular anchor is shown in Figure 3.

The cap of this invention is generally ogival in outline, its longer parallel side co-operating with the lower edge of the web. As noted above, the cap is traversed by four holes aligned with the holes in the web leading to the anchors. Shoulders are provided on the bottom surfaces of the cap at the ends of these holes to furnish bearing surfaces for hold-down nuts; and lugs 22 are placed on the top surface to engage recesses 23 in the flange 24 of the web.

The bearing is assembled with four studs 25 which traverse the four aligned conduits through the cap and web and which screw into the respective anchors 19 or 20. Each stud has a nut 26 at its lower end, engaging the bearing cap to tighten the same into position. An oil line 21 (shown in dotted line in Figure 1) leads from an attaching seat 27 to which the main bearing oil line of the engine may be secured. This insures delivery of adequate quantities of lubricant to the bearing.

In Figure 4 it will be noted that the cap and web are provided with marginal flanges and with a flange about the seats 14, 15, and that the remaining metal is largely cut away except where required to make conduits for the studs. This disposition of metal is such that adequate strength is obtained with the minimum of weight both in the web and in the cap. Further, the conduits are on two spaced, transverse planes which permit them to pass side by side adjacent the lower edge of the web at its juncture with the cap as indicated by the center lines in Figure 2.

The anchors and the holes in the web and cap are so positioned that the studs therein are substantially parallel with the cylinder banks 3. Thus, respective studs are parallel with one cylinder bank, and other studs are parallel with the other cylinder bank. As a result, the forces on the cap when the piston is near the extreme upper point of its travel after the change of direction occurring at the beginning of the power stroke are taken by the studs in direct tension. These are the forces which, in prior constructions, tended to batter or dislocate the cap as then applied.

The anchors shown are such as may be readily machined and placed. The web and the cap are securely interlocked by the lugs on the cap against lateral movement. It is apparent that the nuts might be removed from all four studs and that the cap, although loosened, would be held in place by the studs alone. It is only when the studs are unscrewed from the anchor and withdrawn from the web and the cap that the latter may be separated.

In the construction of the prior art, bearing caps were customarily made rectangular in elevation. The bolts which were used to secure the cap to the web were generally disposed vertically transversing the entire depth of the cap. To obtain the necessary holding power and stability, several bolts were sometimes used on each side of the bearing. Obviously, this required that the bearing cap be of considerable breadth to accommodate these bolts. As the maximum force occurs slightly after the pistons have passed dead center at the beginning of the explosion stroke, the greatest forces to be borne by the bearing block are directed more or less parallel with the cylinders of the engine. In the former construction, it is apparent that the vertically disposed bolts do not effectively meet these conditions. In such circumstances, the metal of the cap or of the bolt under the constant battering would tend to coin slightly; and this would result in a loosening of the cap connection. Such loosening, however slight, seriously dislocated the bearing surfaces; and this effect could not be cured by taking up the bolts. Apart from this, the former type of construction required considerably more metal, and this in turn resulted in greatly increased weight. But regardless of how much metal might be removed in the web of the device, its shape and operation as a buttress required a comparatively large cap.

In the present instance, the bolts or other fastening means are designed to take the maximum forces impressed directly in tension instead of functioning as an abutment. It is no longer necessary to use a rectangular bearing cap with its consequent excess of metal; and the resulting cap of this invention is stronger in design and more efficient in the utilization of the material employed. The use of a common anchor for the studs leading from the ends of the cap tends to tie the whole structure together and to equalize to some extent the forces existing under different circumstances.

It will also be noted that the side anchor studs pass each other at the lower end of the cap and hence there is no unsupported span structure as found in conventional blocks, nor will tightening of these studs tend to spring the cap downwardly in the center. As shown in Figure 2, the center lines of the conduits intersect substantially on the line between web and cap. As both the latter have reinforcing marginal flanges, this greatly strengthens the structure at points where the conduits pass and at which, otherwise, the cross-section would be greatly reduced.

The invention claimed is:

1. In a bearing for an engine having its cylinders banked in V-form, a crankcase web supporting said bearing, a bearing cap supported on said web, a central anchor disposed on said web on substantially the longitudinal axial plane of said motor, a pair of anchors disposed on said web, one on either side of said central anchor, a pair of fastening means disposed substantially parallel with the axial plane of one cylinder bank, a second pair of fastening means disposed substantially parallel with the axial plane of the other cylinder bank, said means designed to secure said cap to said web, one fastening means in each of said pairs engaging said central anchor, the other fastening means in each of said pairs engaging one of the side anchors.

2. In a bearing for an engine having its cylinders banked in V-form, an anchor comprising, a sleeve, a pair of sleeves disposed within said first sleeve having their axes normal to the axis of said first sleeve, said second sleeves being so disposed that the angle between their axes is substantially equal to the angle between the cylinder banks of said engine.

3. In a bearing for an engine having its cylinders banked in V-form, a crankcase web supporting said bearing, a bearing cap supported on said web, a central anchor disposed in said web on substantially the longitudinal axial plane of said engine, a pair of anchors disposed in said web, one on either side of said central anchors, a pair of conduits through said web and said cap disposed substantially parallel with the axial plane of one cylinder bank, a second pair of conduits in said web and said cap disposed substantially parallel with the axial plane of the other cylinder bank, one conduit in each said pair leading to said central anchor, the other conduit in each said pair leading to one of the side anchors, studs disposed within said conduits engaging said anchors, and interlocking means between said web and said cap.

4. In a bearing for an engine having its cylinders banked in V-form, a crankcase web supporting said bearing, a bearing cap supported on said web, a central anchor disposed on said web on substantially the longitudinal axial plane of said engine, a pair of anchors disposed in said web, one on either side of said central anchors, a pair of conduits through said web and cap disposed in one transverse plane and parallel with the axial plane of one cylinder bank, a second pair of conduits in said web and cap disposed in a second transverse plane and parallel with the axial plane of the other bank, said transverse planes being spaced longitudinally of the engine to permit said conduits to extend past each other, one conduit in each pair leading to one of the side anchors, the other conduit in each said pair leading to said central anchor, said side anchor conduits extending past each other adjacent the lower edge of said cap.

HENRY FORD.
CHAS. E. SORENSEN.